United States Patent [19]

Guinard

[11] Patent Number: 5,073,040

[45] Date of Patent: Dec. 17, 1991

[54] MECHANO-OPTICAL DEVICE, IN PARTICULAR A ROTARY OPTICAL JOINT

[75] Inventor: Maurice Guinard, Saint-Cloud, France

[73] Assignee: Electronique Serge Dassault, France

[21] Appl. No.: 473,600

[22] Filed: Feb. 1, 1990

[30] Foreign Application Priority Data

Feb. 9, 1989 [FR] France .................................. 89 01709

[51] Int. Cl.⁵ .............................................. G02B 6/34
[52] U.S. Cl. ........................................ 385/26; 385/36
[58] Field of Search ................. 350/6.4, 6.91, 96.15, 350/96.16, 96.18, 96.19, 96.20, 286, 486

[56] References Cited

U.S. PATENT DOCUMENTS

| 4,589,726 | 5/1986 | Buhrer | 350/96.20 |
| 4,641,915 | 2/1987 | Asakawa et al. | 350/96.18 |
| 4,929,067 | 5/1990 | Sander | 350/421 |
| 4,967,290 | 10/1990 | Grant et al. | 360/64 |

FOREIGN PATENT DOCUMENTS

| 0111390 | 6/1984 | European Pat. Off. . |
| 0218739 | 4/1987 | European Pat. Off. . |
| 0156124 | 5/1988 | European Pat. Off. . |
| 2581204 | 10/1986 | France . |
| 57-195203 | 11/1982 | Japan | 350/96.13 |

Primary Examiner—Frank Gonzalez
Attorney, Agent, or Firm—Handal & Morofsky

[57] ABSTRACT

A mechano-optical device comprises a support adapted to receive at least one substantially parallel incident beam, of known axis of incidence, and a reflecting dihedron, which is substantially straight and rotatable relative to the support about an axis of rotation which is substantially comprised within its plane of bisection and substantially perpendicular to its edge. The axis of incidence is a generatrix of a first surface of revolution about this axis of rotation, and the reflected beam is a generatrix of a second surface of revolution. When the device is being used as a rotary joint, the dihedron rotates at an angular speed which is half that of the incident ray, which permits the reflected beam to remain stationary on its surface of revolution.

47 Claims, 8 Drawing Sheets

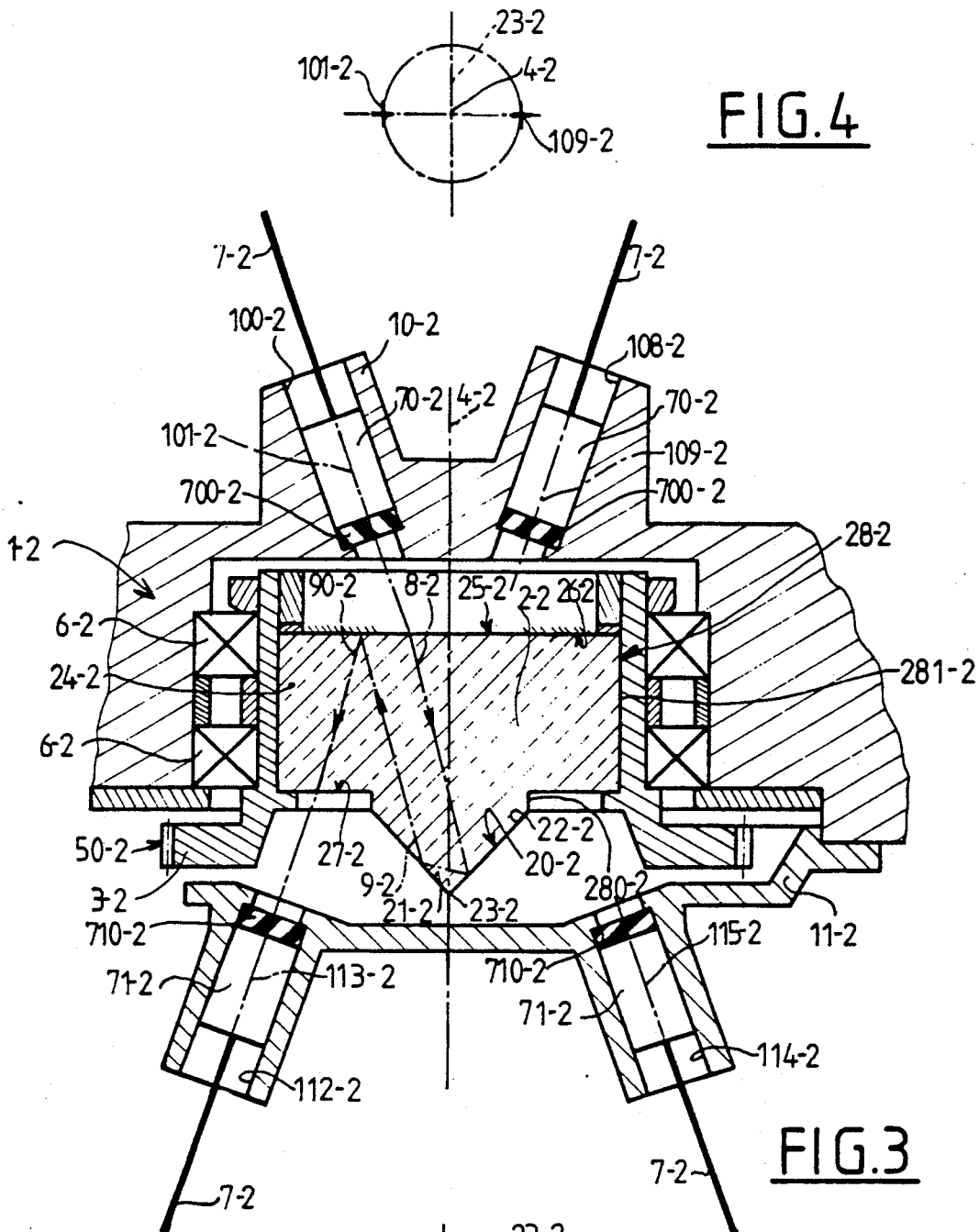
FIG.4
FIG.3
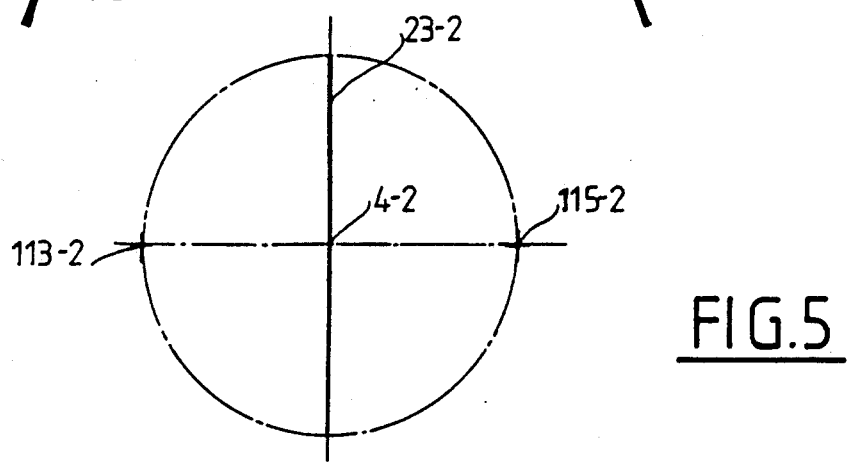
FIG.5

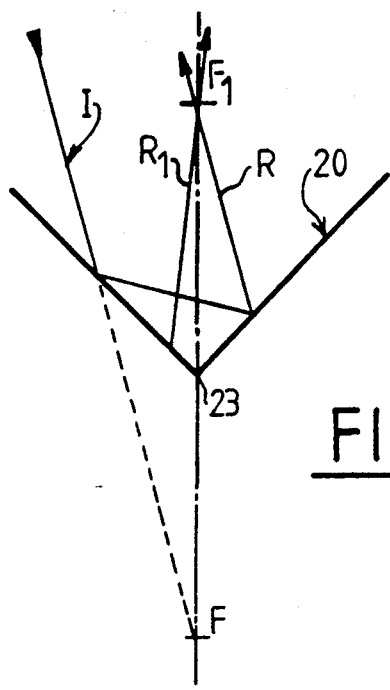
FIG.14
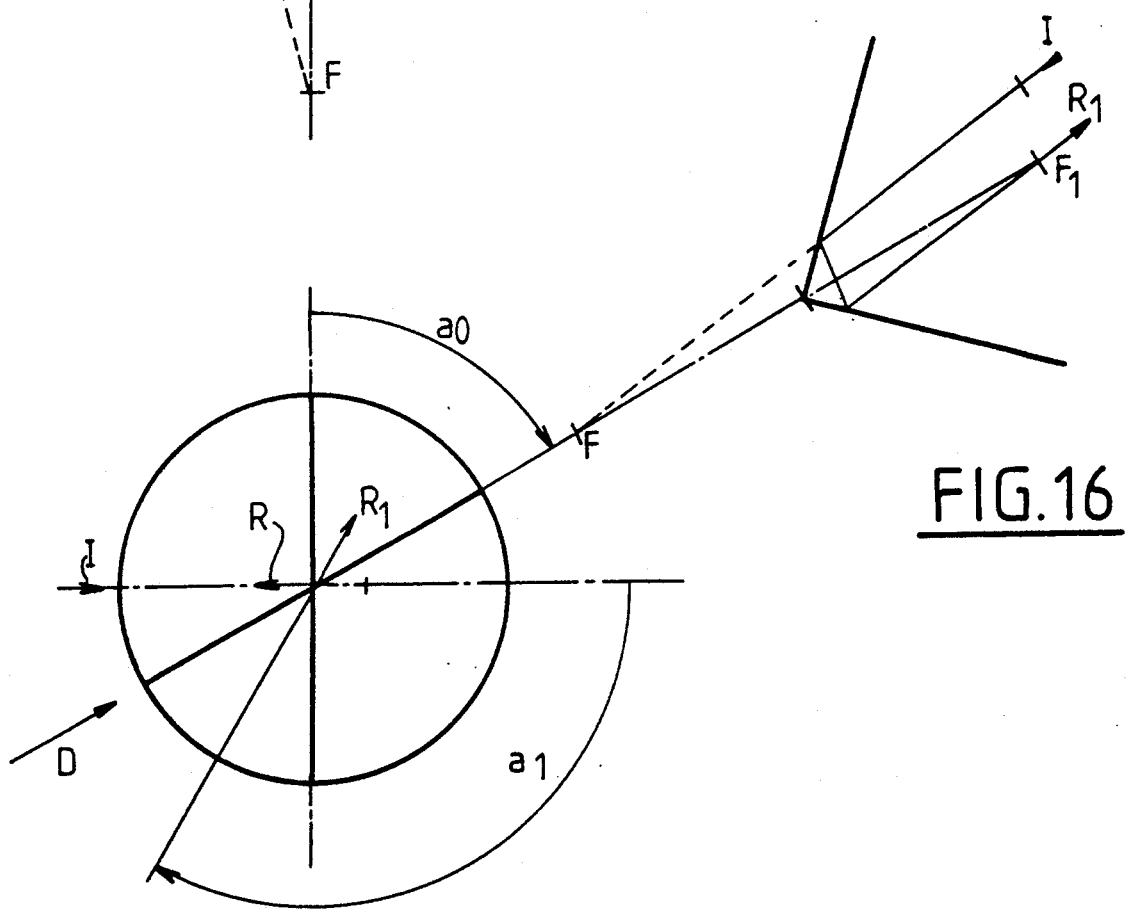
FIG.16
FIG.15

MECHANO-OPTICAL DEVICE, IN PARTICULAR A ROTARY OPTICAL JOINT

BACKGROUND OF THE INVENTION

The invention relates to the optical connection, by one and the same light beam, of two points capable of occupying different relative positions.

Advantageously, it relates in a non-limiting way to mechano-optical devices intended to guide a light beam issuing from at least one optic fibre towards at least one other optic fibre capable of occupying two different positions relative to the first.

Some of these devices are intended to effect switching between at least one so-called "inlet" optic fibre and a plurality of so-called "outlet" optic fibres, which are fixed relative to one another. These are therefore called in general "switches". Those which are more particularly capable of performing this switching in a cyclic manner at a chosen speed are called "distributor switches".

Other devices are used as "rotary optical joints" for guiding the light beam issuing from at least one inlet optic fibre to at least one outlet optic fibre which is rotatable at a specified speed relative to the inlet fibre.

One disadvantage of the current devices, in particular of rotary joints, is the insertion losses, i.e. the loss of at least part of the light energy conveyed by the light beam present within the inlet optic fibre during its passage towards the outlet optic fibre, due to the variation of the relative position of the latter. These insertion losses may sometimes necessitate the use of means for amplifying the signals emitted from the rotary joints.

SUMMARY OF THE INVENTION

One object of the invention is to propose a mechano-optical device capable of connecting, as precisely as possible, by the same light beam, two points capable of having two different relative positions.

It is also an object of the invention to minimise insertion losses in mechano-optical devices with optic fibres, particularly in rotary joints.

A further object of the invention is to propose a switch and a distributor switch which are simple to manufacture.

It is also an object of the invention to propose a rotary joint having a plurality of inlet and outlet fibres, which is simple to manufacture and is subject to only minimal losses.

The invention relates to a mechano-optical device, whose support or frame is adapted to receive at least one substantially incident beam, of known axis of incidence, arising for example from an optic fibre.

According to a very general feature of the invention, this device comprises an element forming a substantially straight reflecting dihedron, which is rotatable relative to the support about an axis of rotation substantially comprised in its plane of bisection perpendicular to its edge; the axis of the incident beam is a generatrix of a first surface of revolution about the axis of rotation of the dihedron; furthermore, the reflecting concavity of the dihedron is turned towards the incident beam to permit a double reflexion thereof.

The reflected beam thus obtained is a generatrix of a second surface of revolution about said axis of rotation.

The invention is based on the observation that the two surfaces of revolution thus defined will make possible, with suitable arrangements, a solution to the problem posed.

Further advantages and features of the invention will become evident from a reading of the detailed description and from the attached drawings.

BRIEF DESCRIPTION OF THE DRAWINGS

FIGS. 3, 4 and 5 illustrate a second embodiment of a device according to the invention, usable in particular as a distributor switch, FIGS. 14, 15 and 16 illustrate the same general principle of the invention where the first surface of revolution is a cone.

DETAILED DESCRIPTION OF THE PREFERRED EMBODIMENTS

Figure 1:
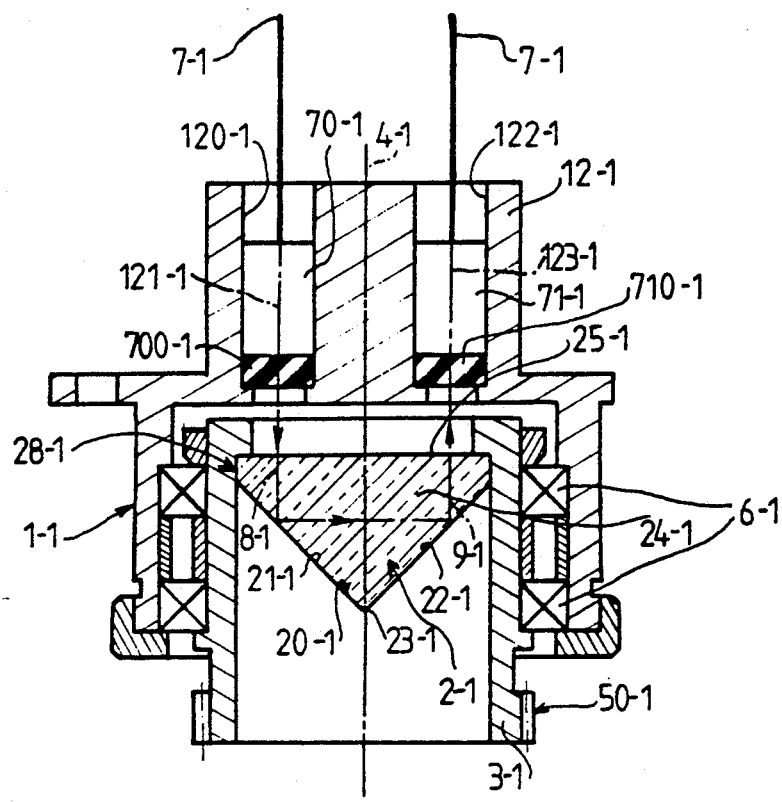
FIGS. 1 and 2 illustrate respectively a partial longitudinal section and a partial view from above of a first embodiment of a device according to the invention, usable in particular as a switch.

Referring to the drawings, the parts of the respective embodiments of the mechano-optical device according to the invention carry references with a suffix equal to the number of the embodiment described. Similar parts or those having a similar function in several embodiments carry the same reference. When these parts are referred to in a general manner, the suffixes corresponding to the different embodiments are omitted.

The dimensions and numeric references given below are only by way of example and are non-limiting.

An important part of the mechano-optical device is an optical block 2 formed of a transparent material 24, which is for example a glass, of a refractive index adapted to the wavelength of the light beams passing through it, e.g. 1.5.

This optical block comprises a straight prism, whose base is a right-angled isosceles triangle. The two perpendicular faces 21 and 22 of the prism define a part forming a straight dihedron 20, referred to more simply below as a, straight dihedron.

This optical block has a first plane of symmetry, formed by the plane of bisection of the dihedron and, advantageously a second plane of symmetry, formed by its median plane perpendicular to the plane of bisection. These two planes of symmetry thus define for the optical block, and hence for the dihedron, an axis of symmetry 4.

The two faces 21 and 22 are metal-coated to give them properties of total reflexion.

In a general manner, these two reflecting faces 21 and 22, which are joined to form the edge 23 of the dihedron, form the reflecting concavity of a symmetrical, straight reflecting dihedron 20.

Obviously, the symmetrical and straight nature includes the inaccuracies of close manufacture.

The straight prism is connected to a body 28 revolving about the axis of symmetry 4, and the optical block thus formed 2 is fixed inside a cylindrical sleeve 3 mounted rotatably, on ball bearings 6, in a support 1, about an axis of rotation 4 substantially identical to the axis of symmetry of the dihedron.

This support 1 is adapted to receive at least one substantially parallel incident beam 8 of known axis of incidence. The dihedron, which is rotatable relative to the support about the axis of rotation 4, is so positioned in the sleeve that its reflecting concavity is turned towards the incident beam to permit a double reflexion thereof, giving rise to a reflected beam 9.

According to a general feature of the invention, the reflecting dihedron is also so positioned in the support that the axis of incidence of the incident beam is a generatrix of a first surface of revolution about the axis of rotation 4, whatever the relative position of the dihedron and of the support. This first surface of revolution may be a cylinder or a cone.

The reflected beam 9 is in this case located on a second surface of revolution about the axis of rotation 4.

The first and second surfaces of revolution may be one and the same cylinder.

They may also be two cones, whose apices are symmetrical relative to the edge 23 of the dihedron 20.

The Applicant has discovered that the use of such a dihedron, which is rotatable substantially about its axis of rotation, combined with its particular positioning relative to the axis of incidence, contributed to achieving the aims of the present invention.

The Applicant has also noted that:
if the dihedron is mobile between a first position and a second position, spaced from the first by a chosen oriented angle a0, and if the incident beam (or the reflected beam) remains in the same position on its own surface of revolution in the two positions of the dihedron, the reflected beam (or the incident beam) assumes, on its own surface of revolution, two positions respectively associated with said first and second positions of the dihedron, the second position being offset from the first by an oriented angle a1 equal to twice said chosen oriented angle a0.

In order to move the sleeve 3, and hence the dihedron, rotatably about the axis 4, the device comprises drive means 5, of which one element consists of a toothed pinion 50 located on the circumference of the sleeve 3 and forming part of a controlled gear system.

Generally, the machine-optical device may also comprise:
an inlet optic, to apply at least one inlet light beam as an incident beam of the dihedron, along said axis of incidence, the inlet beam having an inlet axis located on an inlet surface corresponding to said first surface of revolution, and
an outlet optic to deliver at least one outlet beam starting from the beam reflected by the dihedron, the outlet beam having an outlet axis located on an outlet surface corresponding to said second surface of revolution.

The use of an optical block permits the inlet and outlet optics to comprise part of this optical block.

Corresponding to one of the incident and reflected beams, the inlet beam (or outlet beam) remains in the same position on its own surface in the first and second positions of the dihedron, whereas the outlet (or inlet) beam occupies on its own surface two places corresponding respectively to said first and second positions of the dihedron.

Obviously, if the inlet surface is a surface of revolution about the axis of rotation 4, and having an inlet axis as a generatrix, and if the outlet surface is also a surface of revolution about this axis of rotation, having the outlet axis as a generatrix, the second place is then offset from the first by an oriented angle a1 equal to twice the chosen oriented angle a0.

In the embodiments described here, the inlet beam issues from an optic fibre 7 of a diameter of approximately 50 microns and the outlet beam also penetrates into an optic fibre 7 of the same diameter. It is therefore proposed that these inlet (or outlet) optic fibres are connected to the support 1 via inlet elements 70 (or outlet elements 71), or plugs inserted into cylindrical passages of a diameter of approximately 10 mm. In order that the light beam issuing from the inlet optic fibre is substantially parallel, i.e. slightly convergent, the inlet plug 70 is provided with an appropriate collimator 700. The inlet light beam then has a diameter of 0.1 mm at the outlet of the collimator.

It is also advantageous to provide the outlet plug 71 with a collimator 710 which, if a light beam issuing from the optic fibre 7 were applied to its inlet, would produce at its outlet a light beam of a diameter of approximately 0.5 mm. Thus, when the light beam of a diameter of 0.1 mm issuing from the inlet collimator 700 had passed through the optical block in order to penetrate the outlet collimator 710 (via the "outlet" thereof), it will necessarily converge towards the core of the outlet optic fibre.

Figure 2:
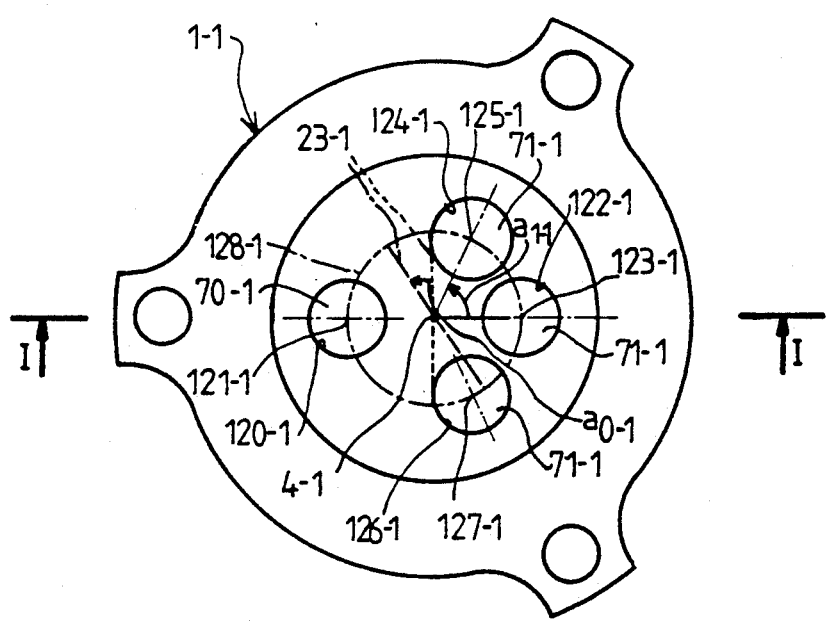

FIGS. 1 and 2 will now be referred to more particularly in order to described the first embodiment of the device according to the invention.

The revolving body 28-1 of the optical block 2-1 is a straight cylindrical part. The height of the triangle of the straight prism is equal to approximately 20 mm and the height of the straight prism, which is in fact the diameter of the cylindrical part, is equal to approximately 35 mm.

The plane surface 25-1 of the cylindrical part 28-1, opposite the edge of the dihedron, form a plane discoidal dioptre between the transparent material and the air, substantially perpendicular to the axis of rotation.

The support 1-1 comprises a cylindrical projection 12-1, located opposite the plane dioptre 25-1. In this cylindrical projection 12-1 are housed four cylindrical passages 120-1, 122-1, 124-1, 126-1 opening on the side of the reflecting concavity of the dihedron. The respective axes of these passages, 121-1, 123-1, 125-1 and 127-1 are arranged on a cylinder 128-1, of a diameter of approximately 25 mm. This cylinder forms, as will be seen below, both the first and second surfaces of revolution as well as the inlet and outlet surfaces.

Two of these axes, 121-1 and 123-1 are arranged symmetrically relative to the axis of rotation 4-1; the third axis (125-1) is offset at an angle by a chosen oriented angle a1-1 equal to 60° measured from the straight line joining the two symmetrical axes 121-1 and 123-1 in the trigonometric direction (anti-clockwise direction). The fourth axis 127-1 is located symmetrically to the third axis relative to the straight line joining the two symmetrical axes 121-1 and 123-1.

Suppose here that the inlet axis of the inlet beam is the axis 121-1 and that the three other axes are capable of forming an outlet axis for the outlet beam.

The dihedron 20-1 is capable of occupying three positions. The first is that shown in FIGS. 1 and 2, in which the plane of bisection forms a plane of symmetry for the two axes 121-1 and 123-1 (edge shown as a dotted line on FIG. 2).

The second is offset relative to the first by an oriented angle a0-1 equal to half the oriented angle a1-1 (edge shown as a dot-dash line in FIG. 2).

The third is offset from the first by an oriented angle equal to the inverse of half the oriented angle a1-1.

The function of this device will be described in more detail below.

It should be noted, however, that the structure of this device, having two passages arranged symmetrically relative to the axis of rotation, can be generalised. When the projection comprises three passages, these must be so arranged that, in the first position of the dihedron, the plane of bisection of the latter forms a plane of symmetry for two respective axes of a first and a second passage. The axis of the third passage is then offset from the axis of the second passage by an oriented angle a1 substantially equal to twice the chosen oriented angle a0, so that, in the second position of the dihedron, the plane of bisection of the latter forms a plane of symmetry for the axes of the first and third passages.

More generally still, whatever the embodiment of a device used as a switch or distributor switch, the support comprises at least a first and second fixed passage, so arranged that, in the first position of the dihedron, the axis of one of these two passages forms said inlet axis, the axis of the other passage forming said outlet axis, as well as a third fixed passage whose axis is offset from the axis of the second passage by an oriented angle a1 equal to substantially twice the chosen oriented angle a0, so that one of the axes of the first and third passages forms, in the second position of the dihedron, said inlet axis, the other axis forming said outlet axis.

If the device is an optical rotary joint, it will be seen below that, whatever the embodiment, the dihedron is capable of being moved continuously relative to the support at a chosen algebraic angular speed v0. The term "algebraic" here refers not only to the value but also to the direction of the speed. The support comprises a first and a second part, each having at least one passage. One of the two parts is fixed in the support, whereas the other is continuously moving relative to the support at an algebraic angular speed v1 substantially equal to twice the chosen algebraic angular speed v0. The dihedron is in this case positioned in the support to ensure an optical correspondence between the passage(s) of the first part and the passage(s) of the second part, whatever the position of the dihedron, so that a light beam enters via the passage of one of the two parts and exits via the passage of the other part.

The structure of certain mechano-optical devices according to the invention may be even more complex. Thus, one of the two inlet and outlet optics may additionally comprise secondary reflecting means turned towards the reflecting concavity of the dihedron and cooperating therewith for one of the incident and reflected beams respectively. The term "secondary" here contrasts with the "principle" double reflexion on the dihedron.

The inlet optic (or outlet optic respectively) may also comprise first (or second respectively) light beam deflecting means.

This type of structure may be found both in the case of a switch and in the case of a rotary joint when at least one passage for an inlet beam (or outlet) opens on to the side of the reflecting concavity of the dihedron (or on the other side), and when the optically corresponding passage for the outlet (or inlet) beam opens on to the side of the convex surface of the dihedron (or on to the side of the reflecting concavity).

The other embodiments of the device according to the invention have structures of this type at least in part, as can be seen in FIGS. 3 to 10, 17 and 18.

In each of the second, third, fourth and fifth embodiments, the first part 10 of the support 1 comprises two passages 100 and 108 opening on the side of the reflecting concavity of the dihedron, and whose respective axes 101 and 109 are arranged symmetrically relative to the axis of rotation 4. These two axes in this case form, for-example, two inlet axes for two different incident beams.

Two passages 112 and 114, which open on the convex side of the dihedron and which each have two axes 113 and 115 symmetrical relative to the axis of rotation 4 are housed on the second fixed part 11 of the support 1.

Figures 6, 7, 8:
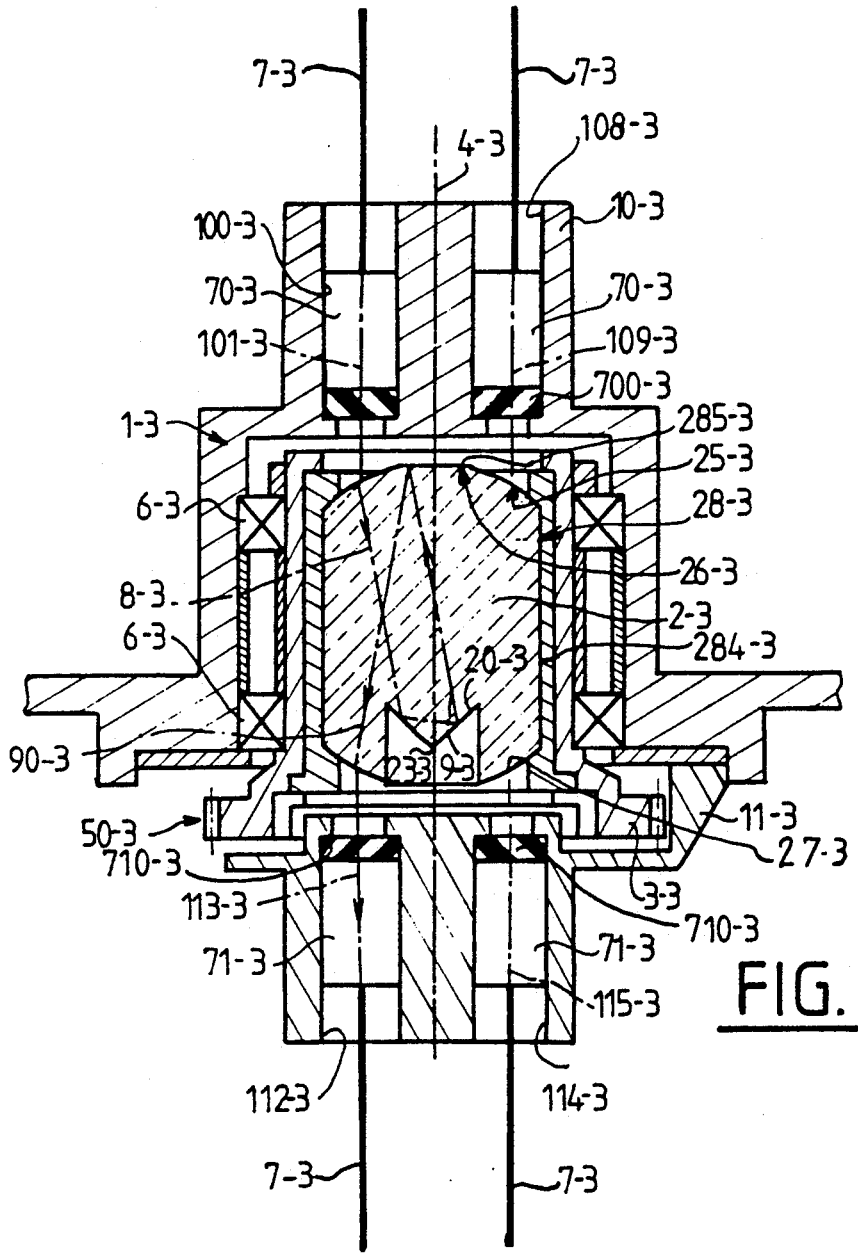
FIGS. 6, 7 and 8 illustrate a third embodiment of a device according to the invention, usable in particular also as a distributor switch.

FIGS. 4 and 7 show, viewed from above in diagrammatic form, the lines of the axes of the passages 100 and 108, and FIGS. 5 and 8 show, viewed from above in diagrammatic form, the lines of the axes of the passages 112 and 114.

The incident and reflected beams are inclined relative to the axis of rotation in order that the light beam can pass from an inlet passage to an outlet passage. The Applicant has proposed two possibilities of creating this condition. The first is to incline directly the inlet and outlet beams. The second is to use deflecting means if the inlet and outlet beams are parallel to the axis of rotation.

In the second and fourth embodiments (FIGS. 3 and 9), the inlet axes are located on a cone of revolution with a half-angle at the apex of approximately 10° and the two outlet axes are located on a cone of the same half-angle at the apex, but inverted relative to the first.

The optical block 2 is the same for these two embodiments. It will therefore be described for the second, referring more precisely to FIG. 3.

The revolving body 28-2 comprises a first cylindrical part 280-2, connected to the straight prism, whose diameter, equal to the height of said straight prism, is substantially equal to 25 mm. This first cylindrical part 280-2 is extended by a second cylindrical part 281-2, whose diameter is approximately 55 mm and whose height is 25 mm.

The lower part of the cylinder 281-2 connected to the cylinder 280-2, which is located in the vicinity of the reflecting concavity of the dihedron, forms a ring 27-2 forming a plane dioptre between the transparent material of the optical block and the air. The plane upper face of the cylinder 281-1 is partly metallised to form an annular reflecting mirror 26-2 turned towards the reflecting concavity of the dihedron. The central disc of the upper face of the cylinder 281-2, internal to the annular mirror, in this case forms another plane dioptre 25-2 between the transparent material of the optical block and the air.

It will be noted in this case that a beam entering or exiting from the optical block via different plane dioptres undergoes refraction of an angle of approximately 5°. It can then be considered that the latter, in both these embodiments equally, form light beam deviation means, although this deviation is minimal due to the inclination of the inlet and outlet beams. Similarly, the annular mirror 26-2 forms the secondary means of reflexion.

In the third and fifth embodiments (FIGS. 6 and 10) the axes 101, 109, 113, 115 of the corresponding passages are arranged along one and the same cylinder having a diameter of approximately 20 mm. The optical block 2 in this case has a different structure in order to permit the passage of a light beam from the first part 10 to the second part 11. Its structure, common to both these embodiments, will only be described with reference more particularly to FIG. 6.

The revolving body 28-3 has a central cylindrical part 284-3 and a first discoidal end 285-3 opposite the reflecting concavity, having a diameter of approximately 10 mm, and forming, by being metallised, the secondary reflecting means 26-3. The central cylindrical part is connected to the discoidal part via a curved surface 25-3 forming a dioptre between the transparent material and the air. The optical block additionally has a further curved surface 27-3 opposite the curved surface 25-3, located opposite the passages 112 and 114, and permitting the cylindrical part 284-3 to be connected to the straight prism. This curved surface 27-3 forms a further dioptre between the transparent material and the air. The curved dioptre s therefore form in this case the means of deviating the light beam.

The second and third embodiments of the device according to the invention may be used as distributor switches. They therefore both have, for example, a first part 10 which is fixed in the support 1.

Therefore, two notable positions of the dihedron can be defined. In the first, the plane of bisection of the dihedron forms a plane of symmetry for the axes of the two passages 100 and 108 as well as for the two passages 112 and 114. In the second position, the plane of bisection contains the axes of the four passages. The chosen oriented angle a0 is in this case equal to pi/2 radians.

The fourth and fifth embodiments of the device can be used as a rotary joint. They therefore both have, for example, a first part 10 which is mobile relative to the support. This arrangement, which is common to both embodiments, will be described solely with reference to the fourth embodiment shown in FIG. 9.

The first cylindrical part 10-4 is rotatable about the axis of rotation 4-4 on ball bearings 6-4 and has, on its circumference, a toothed pinion 51-4. It is necessary for this first part to rotate in synchronisation with the sleeve 3-4, and hence with the dihedron, in the same direction and at twice the speed of the dihedron. Furthermore, the drive means 5-4 comprise a reducing gear 52-4 cooperating with the toothed pinions 50-4 and 51-4.

The dihedron is so positioned that its plane of bisection forms, when the rotary joint is stopped in a particular position, a plane of symmetry for the two inlet axes and the two outlet axes.

Now the operation of the different embodiments of the device according to the invention will be described in detail.

Figure 11:
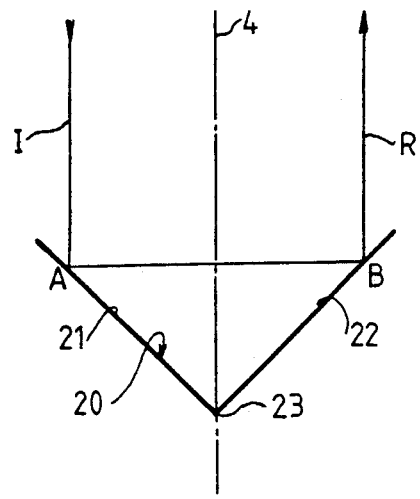
FIGS. 11, 12 and 13 illustrate a general principle of the invention where the first surface of revolution is a cylinder.
Figure 13:
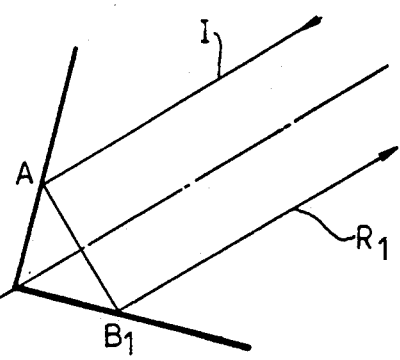

This operation is based on a discovery by the Applicant which is illustrated in two particular cases in FIGS. 11 to 16. FIG. 11 (or 14) is a diagrammatic plan view of the dihedron 20, FIG. 12 (or 15) is a view from above corresponding to the plan view, and FIG. 13 (or 16) is a plan view along the arrow D corresponding to the view from above.

First of all, the case where the first surface of revolution is a cylinder (FIGS. 11, 12, 13) will be considered.

An incident beam I hits the reflecting face 21 at the point A, is reflected in the second face 22 at the point B and gives rise to a reflected beam R. In this first position, the edge 23 is shown in FIG. 11 perpendicular to the plate.

Figure 12:
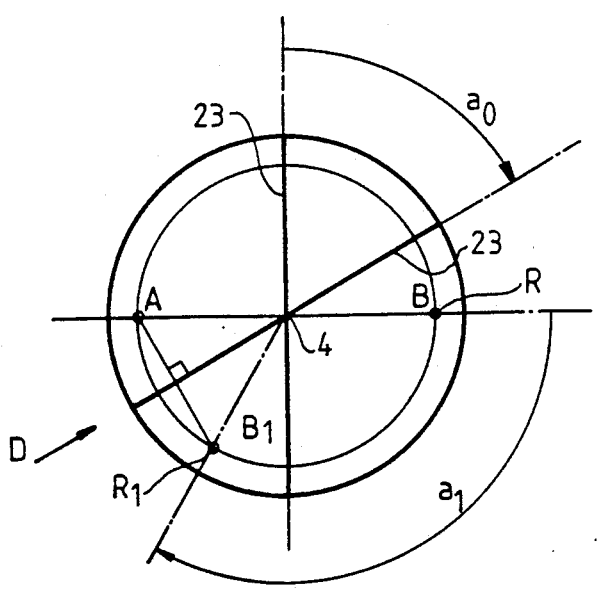

In a second position, the dihedron rotates by an oriented angle a0 so that the edge 23 is inclined as shown in FIG. 12. In this second position, the incident beam I, supposed to be stationary on its first surface of revolution, hits the dihedron at the point A and is reflected at the point B1 on the face 22, giving rise to the reflected beam R1. The Applicant then discovered that the reflected beam R1 is offset by an oriented angle a1, equal to twice the oriented angle a0, relative to the reflected beam R, and the second surface of revolution is in this case the same cylinder.

In the case where the first surface of revolution is a cone with apex F (FIG. 14), the reflected beam R is located on a cone whose apex F1 is symmetrical with the apex F relative to the edge 23 of the dihedron. When the latter revolves about its axis of rotation by a chosen oriented angle a0, the incident beam I, stationary on its surface of revolution, gives rise to a reflected beam R1 located on the same surface of revolution as the reflected beam R but offset therefrom by an oriented angle a1 equal to twice the oriented angle a0.

The applicant also discovered that, in one or other of the types of surfaces of revolution, when the incident beam moves on its surface of revolution by a given oriented angle, the dihedron being stationary, the reflected beam moves consecutively on its corresponding surface of revolution by an oriented angle equal to the inverse of the given oriented angle.

Consequently, if the dihedron is mobile between a first position and a second position, spaced from the first by a chosenoriented angle a0, and if the incident beam assumes on its corresponding surface of revolution two associated positions relative to the first and second positions of the dihedron, the second position being offset from the first by an oriented angle a1 equal to twice said chosen oriented angle, then the reflected beam remains in the same position on its corresponding surface of revolution in the two positions of the dihedron.

This may be further generalised in the following manner. If the dihedron is moved continuously at a chosen algebraic angular speed v0, and if one of the incident and reflected beams is moved on its corresponding surface of revolution at an algebraic angular speed v1 equal to substantially twice the chosen algebraic angular speed a0 ( in the same direction), then the other beam remains substantially stationary on its surface of revolution. This is the principle of the rotary joint.

Now let us consider the case of the switch shown in FIGS. 1 and 2.

When the dihedron is in its first position, the axis of the inlet beam and therefore the axis of the incident beam is the axis 121-1, and the axis of the reflected beam, therefore of the outlet beam, is the axis 123-1. On the other hand, when the dihedron is switched into its second position offset from the first by an oriented angle a1 equal to half the angle al-1, the axis of the reflected beam, and hence the axis of the outlet beam, is the axis 125-1. If the dihedron is switched into its third position, the axis of the reflected beam, and hence the axis of the outlet beam, is the axis 127-1.

In this manner, a switch with one inlet fibre and three outlet fibres has been formed simply.

Now let us consider the case of the two distributor switches shown in FIGS. 3 to 8.

In the first position of the dihedron, the inlet beam arriving along the inlet axis 101 gives rise after refraction in the dioptre 25 to the incident beam 8 which, after reflexion, produces the reflected beam 9, which is reflected in the mirror 26, generating a further reflected beam 90 which, after refraction in the dioptre 27, supplies the outlet beam along the axis 113. The further inlet beam, along the inlet axis 109, will supply, after following a similar path, an outlet beam along the axis 115.

When the dihedron is switched into its second position, the inlet axes of the two inlet beams remaining unchanged, the outlet axis of the first inlet beam is this time the axis 115, whereas the outlet axis of the second inlet beam is this time the axis 113. In this second position, the person skilled in the art will note that the double reflexion can be reduced to a degenerated case of a single reflexion on the edge of the dihedron, if the light beam is sufficiently fine.

If the dihedron is continuously rotated at a predetermined speed, this device can then be used to distribute two inlet beams alternatively along one or other of the outlet beams.

Figure 9:
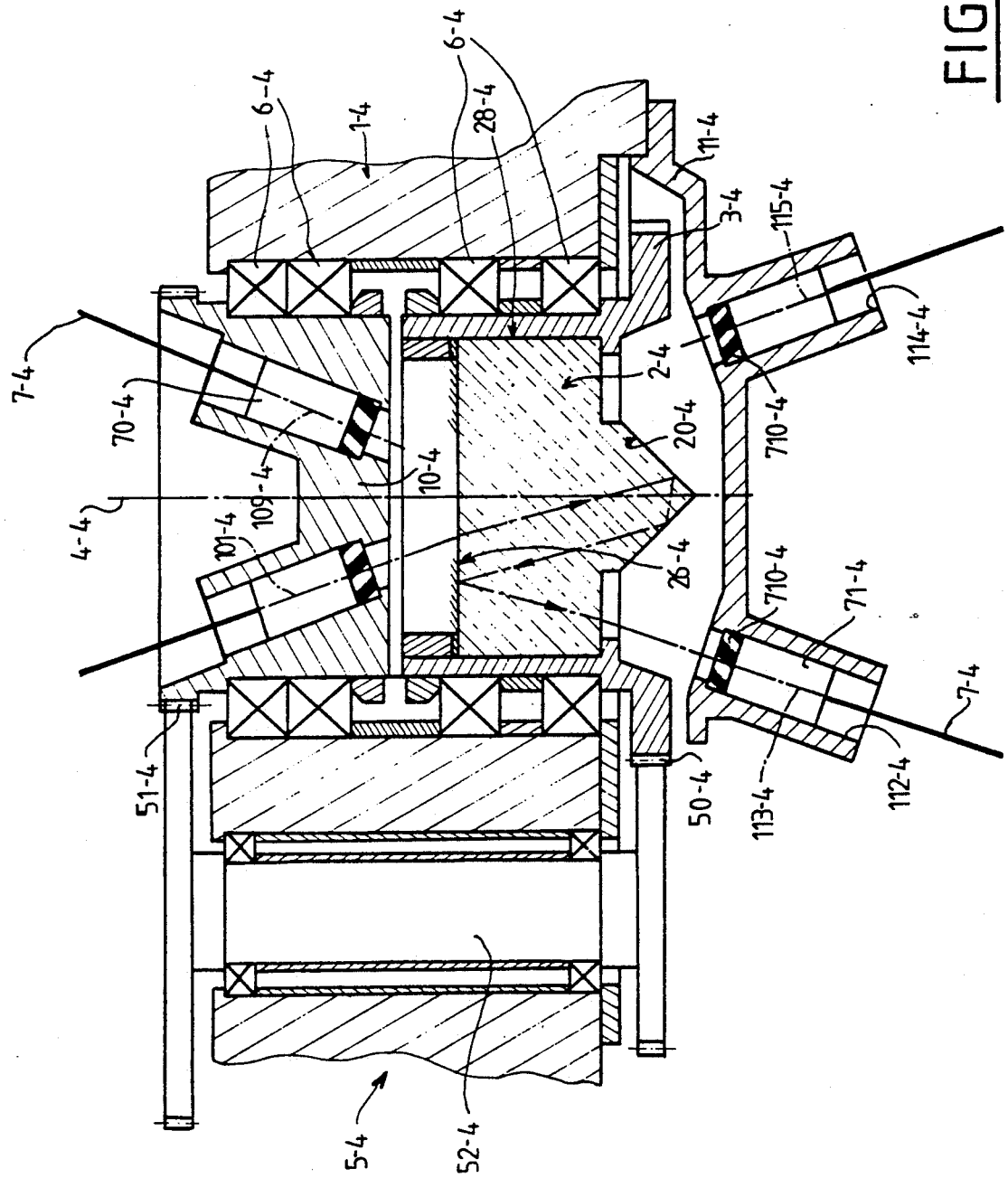
FIG. 9 illustrates a fourth embodiment of a device according to the invention, usable as a rotary optical joint.
Figure 10:
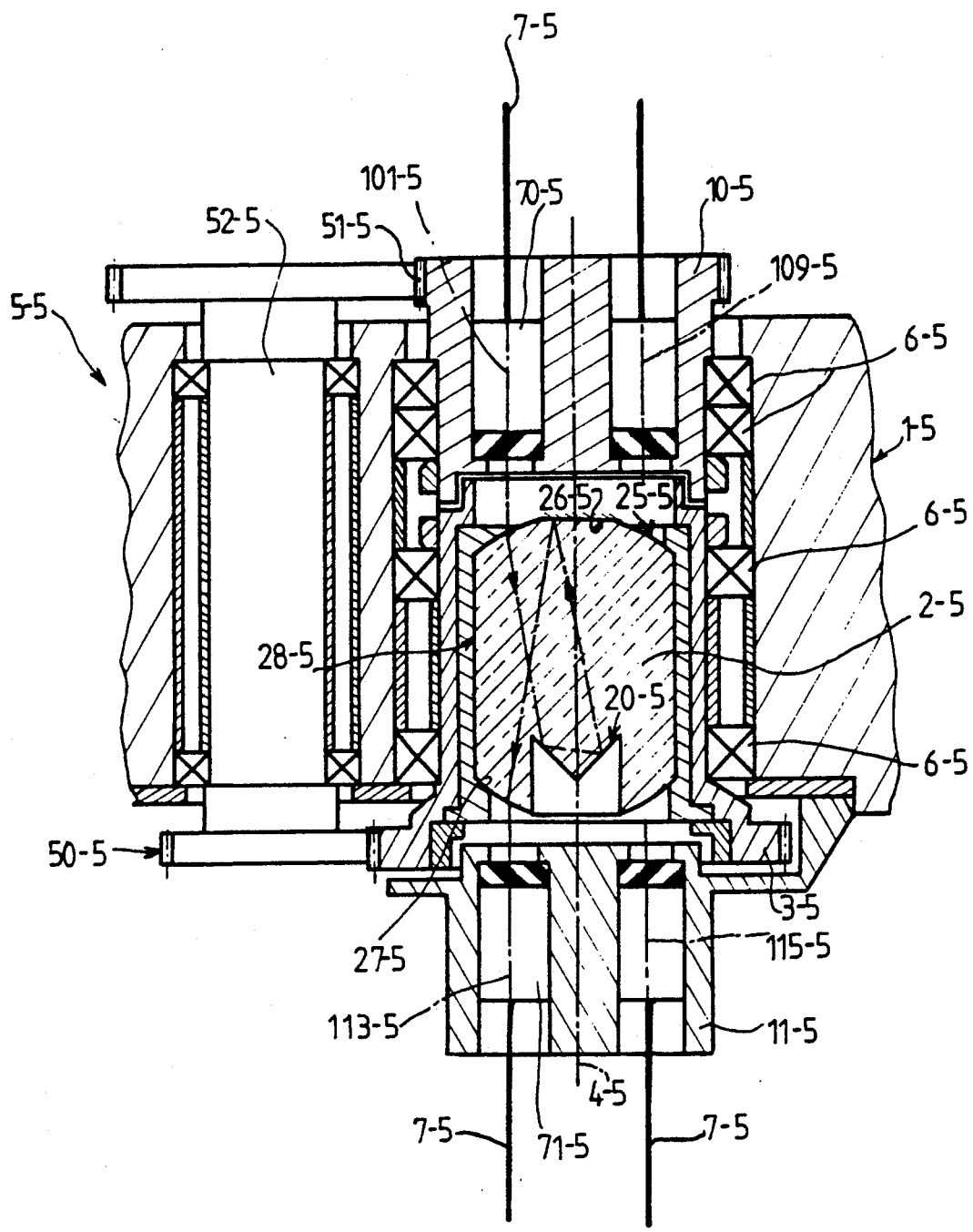
FIG. 10 illustrates a fifth embodiment of a device according to the invention, also usable as a rotary optical joint.

Now let us consider the case of the two rotary joints illustrated in FIGS. 9 and 10.

The drive means 5 drive in rotation the first part 10 at a given angular speed and, simultaneously and in a synchronised manner, via the reducing gear 52, drive the sleeve 3 at an angular speed substantially equal to half the angular speed of the first part. Consequently, although the first inlet beam has its axis 101 rotating on the first surface of revolution, the axis 113 of the first outlet beam is unchanged on its outlet surface of revolution. The same applies to the inlet axis 109 of the second inlet beam and the outlet axis 115 of the second outlet beam. It should be noted here that the speeds of rotation are only limited by the type of bearings used and the quality of the gearing.

Obviously, the precision on the ratio of speeds of rotation of the dihedron and of the mobile part are an important criterion in order that the inlet and outlet axes correspond during operation of the rotary joint. This precision is in this case of the order of 1 minute of arc per half-revolution, but the ratio of speeds could be expressed as being equal to exactly 2 per complete revolution.

Obviously, the parts 10 and 11 may each comprise a plurality of further passages, in an even number, one passage of one of the parts forming an inlet (or outlet) passage, the optically corresponding passage of the other of the parts then forming an outlet (or inlet) passage. Thus multi-fibre rotary joints are formed in a simple manner. Some of these have first and second parts located on the same side of the dihedron.

Figure 17:
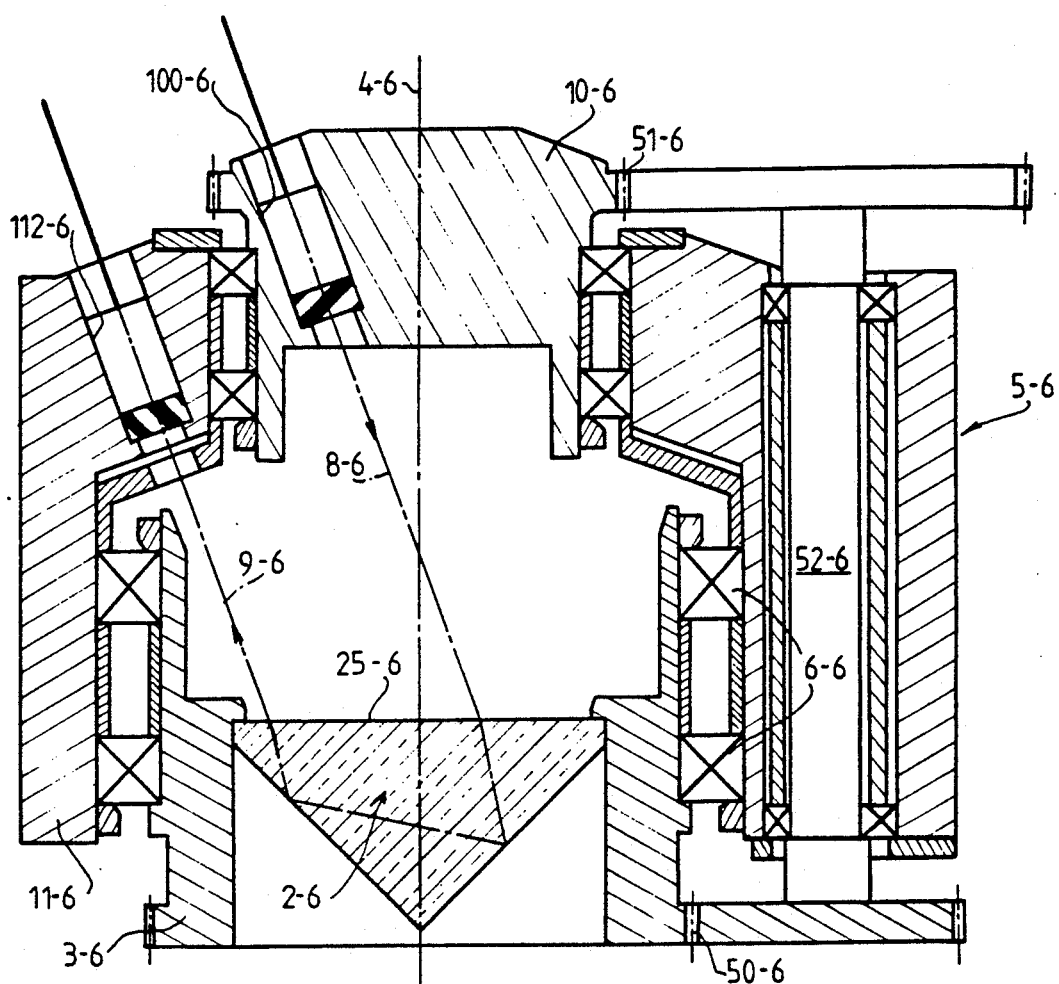
FIGS. 17 and 18 illustrate a sixth embodiment of a device according to the invention, also usable as a rotary optical joint.
Figure 18:
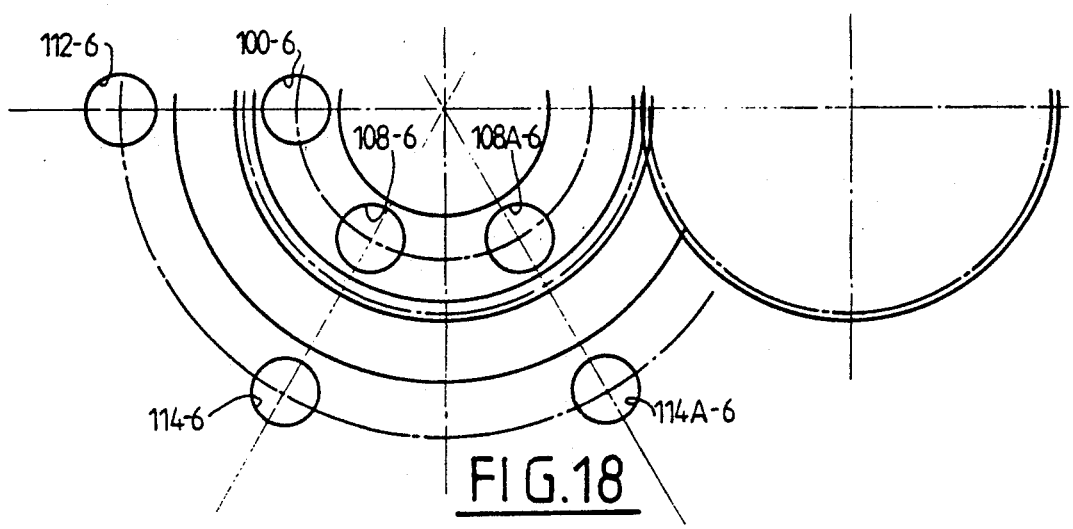

An example of such a multi-fibre rotary joint is shown partly in longitudinal section in FIG. 17 and partly in a view from above in FIG. 18.

In this embodiment, the three inlet passages 100-6, 108-6, 108A-6 of the first mobile part 10-6 open on the side of the reflecting concavity of the dihedron 2-6. The same applies respectively to the three outlet passages 112-6, 114-6, 114A-6 of the second fixed part 11-6. The optical block of this rotary joint, mounted in the sleeve 3-6, is identical to that of the first embodiment. The three inlet beams 8-6 are located on a cone and the three corresponding outlet beams 9-6 are located also on a cone, parallel to that of the inlet beams.

Each inlet and outlet beam undergoes refraction upon passing through the plane dioptre 25-6. Therefore, as has already been stated above, the plane dioptre can be said to form, in this embodiment also, the means of deviating the light beam, although this deviation is minimal due to the inclination of the inlet and outlet means.

It is necessary, finally, whatever the embodiment, and if the beams cross over inside the optical block, that the transparent material of the latter be optically linear.

The invention is not limited to the embodiments described above, but encompasses all variants, particularly the following:

very generally, starting from a plurality of incident beams, all located on the first surface of revolution, a plurality of corresponding reflected beams can be obtained, all located on the second surface of revolution, more generally still, the support may additionally receive at least one further incident beam located on a further first surface of revolution, which is homothetic with the first surface of revolution, whereby it is possible to obtain at least one further corresponding reflected beam located on a further second surface of revolution, which is homothetic with the second surface of revolution;

the term "homothetic" here means that two surfaces of revolution may be of the same type (two coaxial cylinders of different diameters) or of a different type (cylinder and cone);

the number of incident beams depends solely on the dimensions of the mechano-optical device, and any substantially parallel incident beam is suitable, in particular a laser beam);

if the support receives a plurality of inlet beams, through respectively a plurality of inlet passages, the support then comprises a number of outlet passages of these light beams which is at least equal to the number of inlet passages and the dihedron is then capable of assuming a plurality of positions to effect, by switching or distribution, an optical correspondence for each light beam between one inlet passage and one outlet passage at least;

due to the principle of inverse return of light, the incident beams described could be the reflected beams and vice versa;

it would be conceivable for the dihedron to be formed simply of two perpendicular mirrors; in this case, however, means of deviating the light and adapted secondary reflecting means would have to be provided;

it would also be conceivable for the dihedron to be rotatable about a different axis from its axis of symmetry, or even for the dihedron not to be symmetrical relative to any plane perpendicular to its plane of bisection. In this case, its various positions and its positioning in the support would have to be suitably chosen to permit the double reflexion of the incident beam. However, for a rotary joint, it is necessary to provide a symmetrical dihedron, which may be, for example, a part of an asymmetrical dihedron.

Obviously, some of the means described above may be omitted in the variants in which they have no use.

I claim:

1. A mechano-optical device, comprising a support adapted to receive at least one substantially parallel incident beam of known axis of incidence, and an element having a reflecting concavity forming a substantially straight reflecting dihedron which is turned towards the incident beam to permit a double reflexion thereof, wherein said dihedron is rotatable relative to said support substantially about an axis of rotation substantially comprised in a plane of bisection of said dihedron and substantially perpendicular to its edge, whereby said axis of incidence is a generatrix of a first surface of revolution about said axis of rotation and the beam thus reflected is a generatrix of a second surface of revolution about said axis of rotation, said first and second surface of revolution being two cones whose spices are symmetrical relative to the edge of the element forming said dihedron.

2. A device according to claim 1, wherein the element forming said dihedron is substantially symmetrical and said axis of rotation is substantially identical to an axis of symmetry of said element.

3. A device according to claim 2, wherein said element forming said dihedron also comprises part of the surface of an optical block formed of a transparent material of a chosen refractive index, said optical block being rotatable in the support about said axis of rotation.

4. A device according to claim 3, wherein the optical block comprises a straight prism, whose base is an isosceles triangle, connected to a body revolving about an axis of rotation, the optical block being fixed in a sleeve mounted rotatably in said support.

5. A device according to claim 4, further comprising drive means for rotating said element relatively to said support.

6. A device according to claim 5, wherein said drive means comprises a toothed pinion located on the circumference of the said sleeve.

7. A device according to claim 1, wherein the said support is arranged to receive a plurality of incident beams, all located on the first surface of revolution, whereby a plurality of corresponding reflected beams are all located on the second surface of revolution.

8. A device according to claim 1, wherein the said support is arranged to receive at least one further incident beam located on a further first surface of revolution, which is homothetic with the first surface of revolution, whereby at least one further corresponding reflected beam is located on a further second surface of revolution, which is homothetic with the second surface of revolution.

9. A device according to claim 1, wherein the arrangement is such that the first and second surface of revolution are one and the same cylinder.

10. A device according to claim 1, wherein the arrangement is such that upon rotation of said dihedron through a given angle about its axis of rotation, one of the incident and reflected beams remains in the same position on its corresponding surface of revolution, whereas the position of the other beam is displaced on its corresponding surface of revolution through an angle equal to twice said given angle.

11. A device according to claim 10, further comprising an inlet optic for applying at least one inlet light beam as an incident beam of the element forming said dihedron, along said axis of incidence, the inlet beam having an inlet axis located on an inlet surface corresponding to said first surface of revolution; and an outlet optic for delivering at least one outlet beam, starting from the beam reflected by the element forming said dihedron, the outlet beam having an outlet axis located on an outlet surface corresponding to said second surface of revolution.

12. A device according to claim 11, wherein said element forming said dihedron also comprises part of the surface of an optical block formed of a transparent material of a chosen refractive index, said optical block being rotatable in the support about said axis of rotation, and wherein the inlet and outlet optics comprise part of the optical block.

13. A device according to claim 12, wherein the optical block comprises a straight prism, whose base is an isosceles triangle, connected to a body revolving about an axis of rotation, the optical block being fixed in a sleeve mounted rotatably in said support.

14. A device according to claim 11, wherein the said inlet optic comprises first means of light beam deviation.

15. A device according to claim 11, wherein the outlet optic comprises a second means of light beam deviation.

16. A device according to claim 11, wherein one of the two inlet and outlet optics comprises additionally secondary reflecting means turned towards the reflecting concavity of the element forming the dihedron, and cooperating therewith for one of the incident and reflected beams respectively.

17. A device according to claim 11, wherein the inlet surface is a surface revolving about said axis of rotation, having the inlet axis for a generatrix, and the outlet surface is a surface revolving about said axis of rotation, having the outlet axis for a generatrix.

18. A device according to claim 17, wherein at least one of the inlet axis and the outlet axis is inclined relative to the said axis of rotation.

19. A device according to claim 17, wherein at least one of the inlet axis and the outlet axis is parallel to the axis of rotation.

20. A device according to claim 11, wherein the arrangement is such that the inlet beam reaches the inlet optic on one side of the element forming said dihedron and the outlet beam leaves the outlet optic on the same side.

21. A device according to claim 11, wherein the arrangement is such that the inlet beam reaches the inlet optic on one side of the element forming said dihedron and the outlet beam leaves the outlet optic on the other side.

22. A device according to claim 16, wherein said element forming said dihedron also comprises part of the surface of an optical block formed of a transparent material of a chosen refractive index, said optical block being rotatable in the support about said axis of rotation, and wherein the inlet and outlet optics comprise part of the optical block, the optical block comprising a plane surface opposite said reflecting concavity and forming a plane dioptre for the inlet and outlet beams.

23. A device according to claim 22, wherein the optical block comprises a straight prism, whose base is an isosceles triangle, connected to a body revolving about an axis of rotation, the optical block being fixed in a sleeve mounted rotatably in said support.

24. A device according to claim 12, wherein said optical block comprises a disc opposite the reflecting concavity forming said dihedron, together with a ring parallel to the disc and located in the vicinity of said reflecting concavity, which disc and which ring form plane dioptres serving as said inlet and outlet optics and effecting deviation of said light beams of which the inlet and outlet axes are inclined to said axis of rotation, said disc having an annular mirror formed in contact therewith, said mirror facing towards the concavity forming said dihedron and cooperating therewith to provide secondary reflecting means for one of the incident and reflected beams, whereby said inlet and outlet beams enter and leave said inlet and outlet optics on opposite sides of the optical block.

25. A device according to claim 24, wherein the optical block comprises a straight prism, whose base is an isosceles triangle, connected to a body revolving about an axis of rotation, the optical block being fixed in a sleeve mounted rotatably in said support.

26. A device according to claim 12, wherein said optical block comprises curved dioptres serving as said inlet and outlet optics and effecting deviation of said light beams of which the inlet and outlet axes are parallel to said axis of rotation, and further comprises a plane discoidal mirror formed on the optical block opposite the reflecting concavity and cooperating therewith to provide secondary reflecting means for one of the incident and reflected beams, whereby said inlet and outlet beams leave said inlet and outlet optics on the opposite sides of the optical block.

27. A device according to claim 26, wherein the optical block comprises a straight prism, whose base is an isosceles triangle, connected to a body revolving about an axis of rotation, the optical block being fixed in a sleeve mounted rotatably in said support.

28. A device according to claim 11, wherein the said support comprises first and second fixed passages, so arranged that, in a first position of the element forming a dihedron, the axis of one of these two passages forms said inlet axis, the axis of the other fixed passage forming said outlet axis, and a third fixed passage whose axis is offset from the axis of the second passage by a predetermined angle in such a manner that upon movement of the element forming said dihedron through an angle equal to half said predetermined angle into a second position, one of the axes of the first and third passages forms said inlet axis and the other axis forms said outlet axis.

29. A device according to claim 28, wherein said three passages open on one side of the reflecting concavity of the element forming said dihedron.

30. A device according to claim 29, wherein the arrangement is such that the said inlet surface and the said first surface of revolution are one and the same cylinder, that the respective axes of the three passages are located on said cylinder, that, in the first position of the element forming said dihedron, the plane of bisection thereof forms a plane of symmetry for the first and second axes, and that, in the second position of the element forming said dihedron, the plane of bisection thereof forms a plane of symmetry for the first and third axes.

31. A device according to claim 30, wherein the first and second axes are symmetrical relative to the axis of rotation of said dihedron.

32. A device according to claim 30, wherein the element forming a dihedron is switchable between said two positions, and the arrangement is such that the inlet axis of the inlet beam is the first axis, the outlet beam being, in the first position of the element forming a dihedron, the second axis, and in the second position of the element forming a dihedron, the third axis.

33. A device according to claim 27, wherein the element forming said dihedron comprises an optical block incorporating secondary reflecting means arranged to cooperate with said reflecting concavity whereby said inlet and outlet surfaces are located on opposite sides of the optical block and wherein the said first passage opens on one of said opposite sides of the optical block and the second and third passages open on the other.

34. A device according to claim 28, wherein the support comprises at least one further passage, which is offset at an angle relative to the third passage and corresponding to at least a third position of the element forming said dihedron.

35. A device according to claim 28, wherein the said support is arranged to receive a plurality of inlet beams, through a plurality of corresponding inlet passages, the support comprises a number of outlet passages which is at least equal to the number of inlet passages, and the element forming a dihedron is capable of assuming a plurality of positions in order to effect an optical correspondence for each light beam between at least one inlet passage and one outlet passage.

36. A device according to claim 33, wherein the axes of the second and third passages are arranged symmetrically relative to the axis of rotation, the said predetermined angle being equal to pi radians.

37. A device according to claim 36, wherein the support is arranged to receive two inlet beams and comprises a fourth passage whose axis is symmetrical with that of the first passage relative to the axis of rotation, and forming with the first passage a first pair of passages, whereas the second and third passages form a second pair of passages, and wherein the plane of bisection of the element forming a dihedron forms, in said first position, a plane of symmetry for the four axes of the four passages, and contains them in said second position, in such a manner that each light beam enters via one passage of one of the two pairs and exits via one passage of the other pair, the two beams using different passages.

38. A device according to claim 28, including means for rotating the element forming said dihedron continuously at a predetermined speed to distribute the inlet beam alternatively along one or other of the outlet axes.

39. A device according to claim 2, wherein the said support comprises a first and second part, each having a passage, one of the first and second parts being fixed whereas the other is rotatable about an axis of rotation and wherein said device further comprises means for rotating the element forming said dihedron at a first algebraic angular speed and means for rotating the rotatable part of said support at a second algebraic angular speed substantially equal to twice said first speed, the arrangement being such that the element forming said dihedron maintains an optical correspondence between said passage of the first part and said passage of the second part during such rotation so that a light beam can enter via the passage of one of the two parts and exit via the passage of the other part.

40. A device according to claim 39, wherein each said part comprises a number of passages, this number being larger than two, each passage of one of the parts forming an inlet passage and an optically corresponding passage of the other of the parts then forming an outlet passage.

41. A device according to claim 39, wherein the arrangement is such that all of the passages of the first and second parts open on to one side of the element forming said dihedron, towards said reflecting concavity.

42. A device according to claim 39, wherein the arrangement is such that the passage of one of the said two parts opens on to a side of the element forming said dihedron that faces said concavity whereas the passage of the other part opens to an opposite side of the said element.

43. A device according to claim 39, wherein said element forming said dihedron also comprises part of the surface of an optical block formed of a transparent material of a chosen refractive index, said optical block being rotatable in the support about said axis of rotation, said optical block comprises a straight prism, whose base is an isosceles triangle, connected to a body revolving about an axis of rotation, the optical block being fixed in a sleeve mounted rotatably in said support, said means for rotating said element forming said dihedron comprises a toothed pinion located on said sleeve, said means for rotating the rotatable part of the support comprises a further toothed pinion located thereon, and a reducing gear is arranged to cooperate with the toothed pinion located on the circumference of the sleeve and this further toothed pinion.

44. A device according to claim 28, further including inlet and outlet transport means for conveying said inlet and outlet beams, an inlet element inserted into each inlet passage and an outlet element inserted into each outlet passage, said inlet and outlet elements serving to fix the means of transport to the support.

45. A device according to claim 44, wherein the transport means for the inlet and outlet beams are optical fibres and each inlet element comprises a collimator.

46. A device according to claim 45, wherein each outlet element comprises a collimator.

47. A device according to claim 3, wherein the transparent material of the optical block is optically linear.

* * * * *